United States Patent [19]
Cavanna

[11] Patent Number: 4,818,896
[45] Date of Patent: Apr. 4, 1989

[54] OPTICAL TRANSMITTER DRIVER WITH CURRENT PEAKING

[75] Inventor: Vicente V. Cavanna, Loomis, Calif.

[73] Assignee: Hewlett-Packard Company, Palo Alto, Calif.

[21] Appl. No.: 90,865

[22] Filed: Aug. 28, 1987

[51] Int. Cl.[4] .................... H03K 19/14; H03K 17/12; H03K 17/64; H03K 19/086

[52] U.S. Cl. .................................. 307/362; 307/270; 307/311; 307/355; 307/455; 330/252

[58] Field of Search ............... 307/270, 311, 455, 355, 307/360, 362; 330/252

[56] References Cited

U.S. PATENT DOCUMENTS

| | | | |
|---|---|---|---|
| 3,922,570 | 11/1975 | Eguchi et al. | 307/270 |
| 3,968,399 | 7/1976 | Jarrett | 307/311 |
| 4,485,311 | 11/1984 | Goerne et al. | 307/311 |
| 4,571,506 | 2/1986 | Lisco | 307/270 |
| 4,622,477 | 11/1986 | Uda | 307/270 |

Primary Examiner—Stanley D. Miller

[57] ABSTRACT

A driver for an electro-optical transducer, such as a light-emitting diode (LED) is disclosed which shapes current pulses so as to contain "spikes" during turn-on and turn-off in order to quickly charge and discharge the junction and stray capacitances of the LED. Degeneration resistors interconnect the emitters of switching transistors used in a differential amplifier supplying the current to the LED and in a differential amplifier supplying a "peaking" current to the switching amplifier. A capacitor couples the amplifiers to conduct the additional current to the LED when it is initially turned on and charges the cathode of the LED. The emitter degeneration resistors couple the amplifiers to current sources and allow the amplifiers to be driven by emitter-coupled logic (ECL) gates without ringing. The resistors also linearize the transfer functions of the amplifiers so that the voltage swing of the ECL driver does not overly turn-off the transistors within the amplifiers, thereby improving response time.

6 Claims, 5 Drawing Sheets

OPTICAL TRANSMITTER DRIVER WITH CURRENT PEAKING

This invention relates to digital driver circuits and, more particularly, to a high-impedance driver employing current pulses suitable for use in driving a light-emitting diode at high speeds.

BACKGROUND OF THE INVENTION

GaAlAs light-emitting diodes (LEDs) are a popular optical source for optical communication applications using optical fibers. The optical output is typically directly pulse modulated by varying the driving current. For binary (2-level) digital applications, a current in the range 50 to 300 mA must be switched on and off at high speed through the LED in response to a low-level data-input signal. A small dc forward bias (approximately 1mA) added to the switched current may prove advantageous in high-bit-rate appications by maintaining charge on the diode's capacitance. The intrinsic radiative recombination time of the LED permits very high modulation rates.

For an ideal LED, if the injected carriers arrive instanteously at the recombination (diffussion) region, the rise time of the spontaneous emission is governed solely by the spontaneous recombination time of the carriers. However, in driving a practical diode, the junction capacitance and the stray capacitance cause delay in the arrival time of the injected carriers at the recombination region. Thus, the rise time of the spontaneous emission would be either (i) material-limited by the spontaneous recombination time or (ii) circuit-limited by the time constant of the driving circuit (including the junctional capacitance of the diode).

For typical LEDs such as Hewlett Packard's HFBR-1402 the optical pulse risetime attainable when (i) is the limiting factor is a small fraction of that attainable when (ii) is the limiting factor.

One way to minimize the effect of the junction and stray capacitance is to use a low impedance (voltage type) driver. This is undesirable because the resulting LED current and therefore the optical flux would then not be accurately controlled. Low impedance drivers have been used to switch LEDs. A survey of these drivers is contained in "Semiconductor Devices for Optical Communications", *Topics in Applied Physics*, Vol. 39, pp. 170-182. The problem is the difficulty in controlling the LED current and, therefore, the optical power. The drivers described therein are unsatisfactory at high bit rates because the phase shift and gain provided are unsuitable and circuit stability is difficult to obtain.

Analog compensation of LED junction capacitance such as is described in "Drive Fiber-Optic Lines at 100 MHz", *Electronic Design*, Vol. 15 (1974) pp. 96-99 is another technique. In this class of implementations the LED is operated in its "linear" region. A filter is used to decrease attenuation with frequency in order to compensate for the roll-off in the LED frequency response. The over-all frequency response is thus flat over a large frequency range. One problem associated with this technique is that the LED is only linear over a small region and consequently one cannot take advantage of the full power output of the LED. Another problem is that the LED capacitance varies significantly from device to device and consequently most LEDs will be significantly over/under compensated.

SUMMARY OF THE INVENTION

The present invention uses a high-impedance driver of the current source type which shapes current pulses such that they contain spikes during turn-on and turn-off in order to quickly charge/discharge the junction and stray capacitances. Such current spikes would occur when using a low impedance driver as the driver supplies the current necessary to charge the junction capacitance to the voltage demanded by the driver.

The present invention consists of a driver that produces such current pulses. The present invention attempts to minimize the effect of condition (ii) (supra) so that the limiting factor becomes condition (i) (supra). The present invention provides an improved method of producing the peaking current impulses and of adding them to the basic current pulse. The shape of the peaking current is nearly independent of the main current pulse and the junction capacitance of the LED, by virture of the LED capacitance being much larger than the capacitor that couples the peaking current impulses to the LED.

Unlike previous circuits, the current demanded from the power supply by this invention is constant. Accordingly, the task of filtering is much easier. The symmetry of the circuit makes it tolerant of variation in device parameters. Very high-speed performance is possible: with 2N5943 as the switching transistors, optical transition times (10%-90%) of 2ns are feasible.

In a preferred embodiment the current switch of the present invention is driven by an emitter-coupled logic (ECL) driver. Degeneration resistors at the emitters of the switching transistors linearize the transfer function of the emitter-coupled switches so that the input voltage swing is just sufficient to cause the current switch of the present invention to limit. This prevents the transistor of the switch that is OFF from being strongly reverse-biased and lowers the magnitude of the current spike required from the ECL driver for charging the transistor junction capacitance and keeps the ECL driver output from ringing.

BRIEF DESCRIPTION OF THE DRAWINGS

FIG. 1 is a unitary drawing comprising

DETAILED DESCRIPTION OF A PREFERRED EMBODIMENT

Figure 1A:
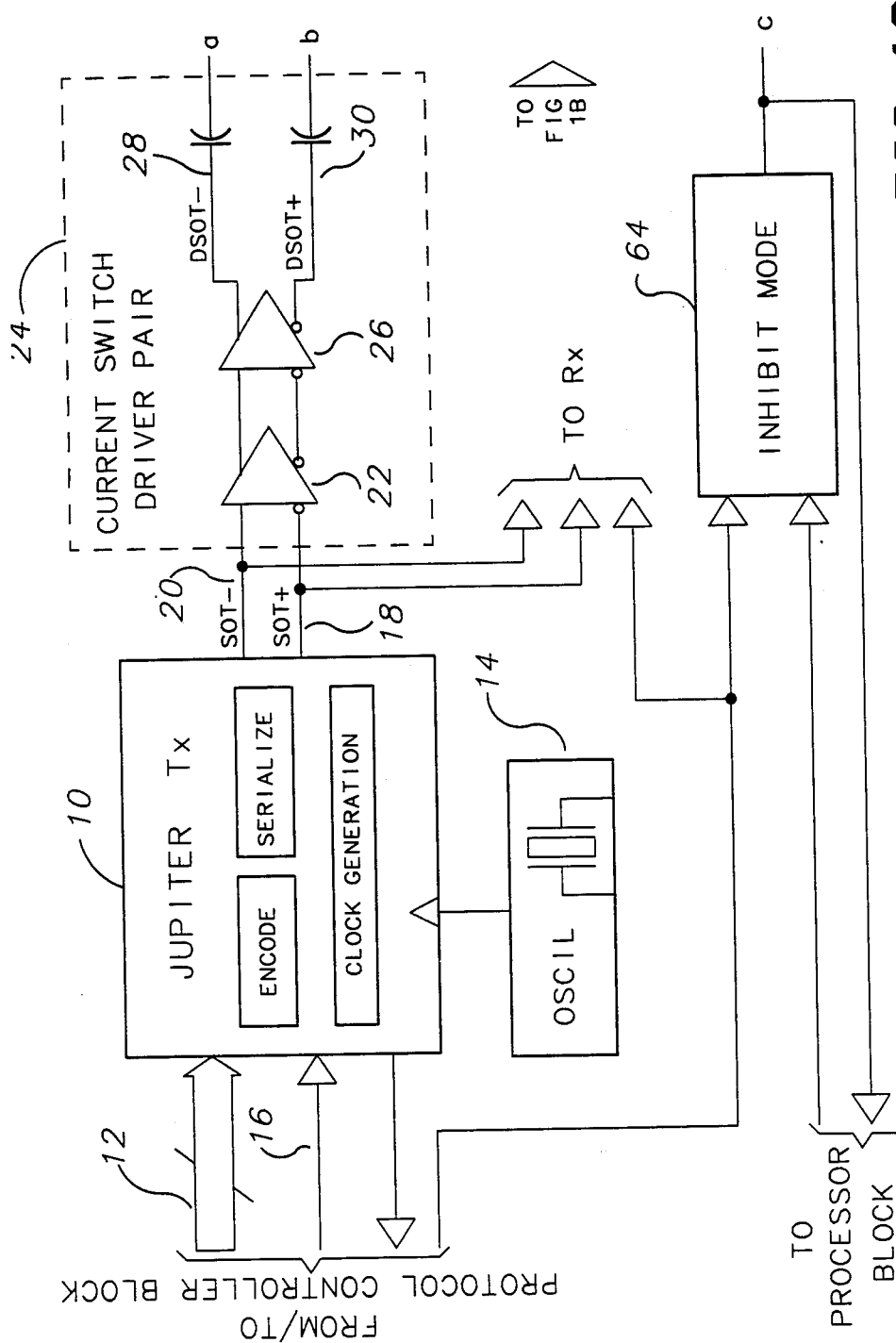
FIG. 1A and FIG. 1B, is a block diagram of a fiber-optic conversion device employing the driver circuit of the present invention.

FIG, 1A and 1B illustrates fiber optic conversion apparatus providing conversion of parallel data to be transmitted to the serial data format employed by an optical interface of the transmitter. In FIG. 1A, a parallel-to-serial block 10 receives data in parallel via a bus 12 from a source which is to be converted to light energy for transmission onto a fiber optic network. The parallel-to-serial block 10 encodes and serializes the data received on bus 12. An oscillator 14 provides a master clock signal to the parallel-to-serial block 10. A Jupiter Transmit Clock (J_TX_CLK+) clock signal is provided by block 10 on a signal line 16 and is used by protocol controller block (not shown) to generate the parallel data received on bus 12. Encode, serialize and internal clock generation functions are performed by the parallel-to-serial block 10. The encoding portion employs a balanced coding scheme thus assuring that the serial bit stream generated by block 10 has little or no dc offset. These functions are well-known to those skilled in the art and will not be further described herein.

Parallel-to-serial block 10 generates a serial output transmit (SOT+, SOT−) differential signal pair on lines 18 and 20, respectively. This signal pair has, preferably, an 80 million baud rate. SOT+ and SOT− are received by a differential amplifier 22 at an inverting and non-inverting input terminal, respectively. Differential amplifier 22 is a differential emitter-coupled logic (ECL) receiver and forms the first stage of a current switch driver pair 24.

The true and complemented output signals generated by differential amplifier 22 are conducted to the non-inverting and inverting input terminal, respectively, of a second differential amplifier 26, which forms the second stage of current switch driver pair 24. A capacitor 28 is connected between the true output of amplifier 26 and a current switch 32 and a capacitor 30 is connected between the complemented output of amplifier 26 and a peaking circuit 34. The current switch driver pair 24 buffers the differential serial output pair signals SOT+ and SOT− from block 10 and drive the current switch 32 and the peaking circuit 34. The signals generated by current switch driver pair 24 are a driver serial output transmit (DSOT+, DSOT−) differential signal pair. The capacitors 28 and 30 provide dc isolation.

Figure 1B:
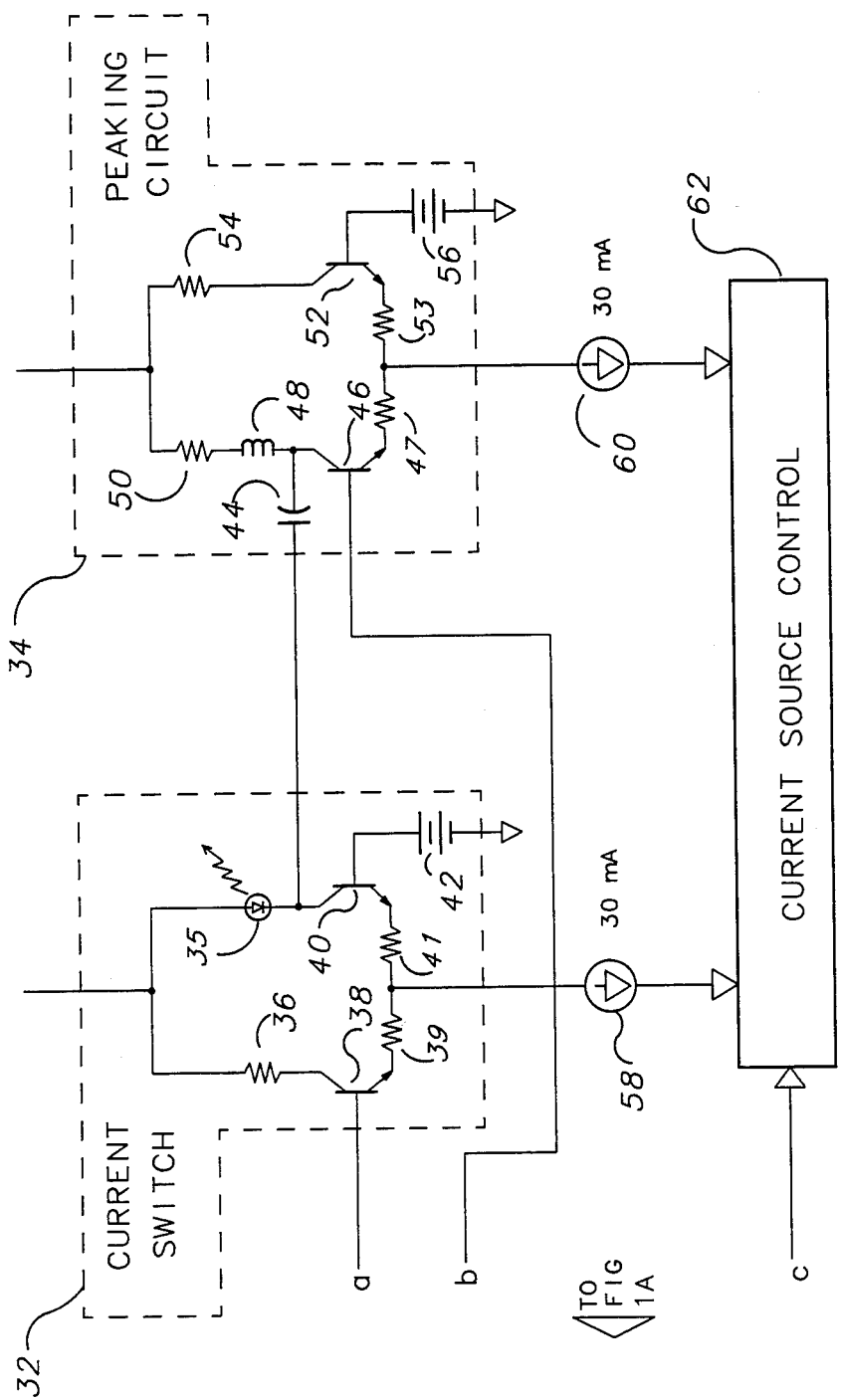

The current switch circuit 32 is illustrated in FIG. 1B in simplied form. As shown, it comprises a light-emitting diode (LED) 35. Current flowing through LED 35 causes the LED to emit photons and the optical power produced is approximately linearly-related to the current flow. Current flowing through the LED 35 will be considered to correspond to a logic value ONE and an asserted (ON) state; absence of current to a logic value ZERO of deasserted (OFF) state. A small amount of current flows through LED 35 at all times. This biasing current permits fast switching of LED 35.

The remaining portion of current switch 32, shown in FIG. 1B, is a resistor 36 one terminal of which is connected to the anode of LED 35. Their common connection is also connected to a source of positive voltage. A pair of NPN transistors 38 and 40 form a differential pair, the emitters of which are connected together via a pair of resistors 39 and 41. The base of transistor 38 is connected to the current switch driver via capacitor 28. The base of transistor 40 is maintained at a predetermined bias voltage, shown as a battery 42. The collector of transistor 38 is connected to the second terminal 36. The collector of transistor 40 is connected to the cathode of LED 35, and their common connection also is connected to a first terminal of a capacitor 44.

Capacitor 44 draws off current to the peaking circuit 34. Peaking circuit 34 improves the quality of the optical waveform by drawing additional current through the LED 35 when it is initially turned ON and supplying reverse current to the LED 35 when it is turned off. This action tends to sharpen the turn ON and turn OFF response of the LED.

Peaking circuit 34 as shown in FIG. 1B, in simplified form, contains an NPN transistor 46 whose collector is connected to the second terminal of capacitor 44. This common connection, in turn, is connected to a terminal of a serial connector of an inductor 48 and a resistor 50. A second terminal of the serial conduit is connected to a source of positive voltage. The base of transistor 46 is connected to the second terminal of capacitor 30. The emitter of transistor 46 is connected to an emitter of an NPN transistor 52 via a pair of resistors 47 and 53. The collector of transistor 52 is connected to the source of positive voltage via a resistor 54. The base of transistor 52 is maintained at a predetermined bias voltage, shown as a battery 56.

The common emitter connections of transistors 38 and 40 provided by resistors 39 and 41, and transistors 46 and 52 provided by the resistors 47 and 53, are connected to a 30ma current source 58 and a 30ma current source 60, respectively. The current source are, in turn, connected to a current source control 62. The current source control circuit, which will be described in connection with FIG. 2C, sets the level of operating current of the current switch 32 and peaking circuit 34.

Current source control 62 receives a control signal from an inhibit mode circuit 64. The inhibit mode circuit 64 receives a Disable_Optic_Transmitter_(-DOT−) signal and a JLBK+ signal which disables the current sources 58 and 60, as will be described in connection with FIG. 2C.

Figure 2A:
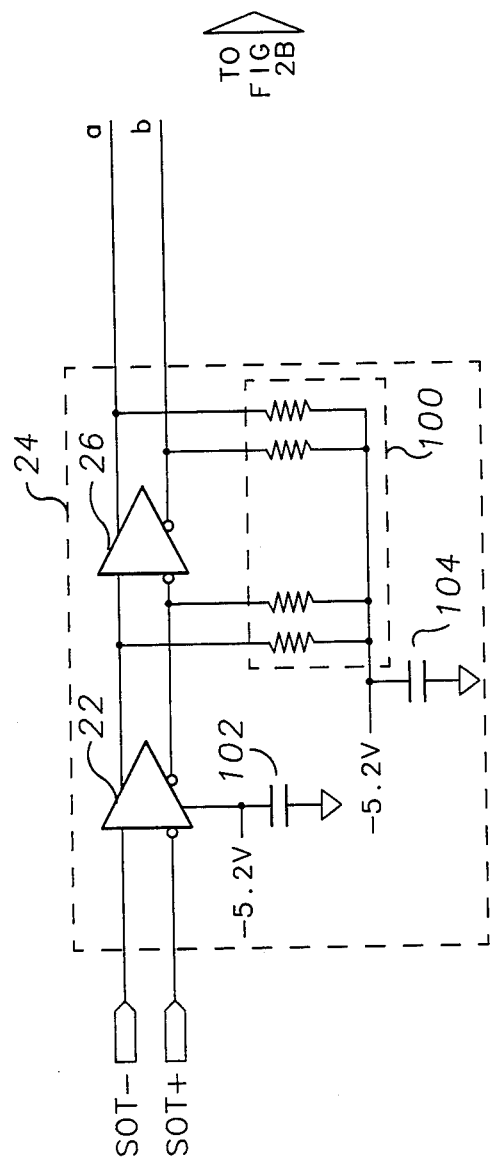
FIG. 2 is a unitary drawing comprising FIG. 2A, FIG. 2B and FIG. 2C, and is a schematic diagram of the driver circuit of the present invention.
Figure 2B:
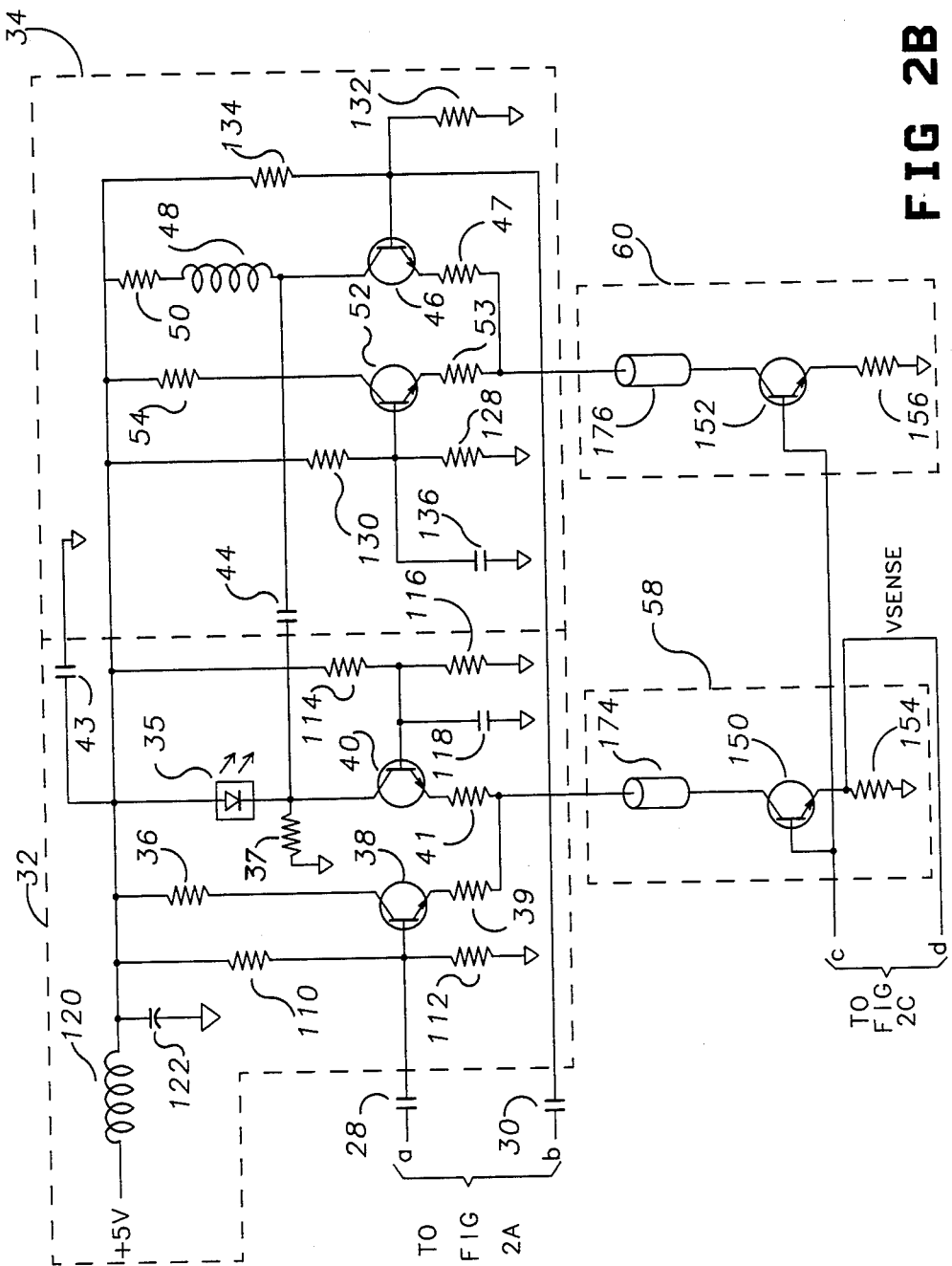

FIGS. 2A and 2B is a schematic diagram of the driver circuit of the present invention. Elements lillustrated in FIGS. 2A and 2B which are common to FIGS. 1A and 1B bear the same reference numeral.

With reference to FIG. 2A, the Current Switch Driver 24 comprising operational amplifiers (op amps) 22 and 26 is used to buffer the differential serial output pair, SOT+, SOT− from the Transmitter Block 10 and drive the LED switch 32 and peaking circuitry 34. In a preferred embodiment, two stages of an MC10216 ECL Driver are used to perform this function. SOT+ and SOT− drive the first stage 22. The outputs of the first stage drive the second stage 26 to form DSOT+ nd DSOT−. This differential output pair is isolated from the LED current switches and peaking circuits by capacitors 28 and 30 for D.C. biasing purposes. Resistor network 100 is used to terminate and provide loading for the ECL output drivers of op amp 26. The common line of the resistor network is connected to VEE(−5.2V). Capacitors 102 and 104 are used for supply bypassing.

With reference to FIG. 2B, current is selectively driven through the Transmit LED 35 means of differential Current Switch 32. Transistors 38 and 40 form a differential pair, with the collector of transistor 40 connected to the cathode of Transmit LED 35 and to ground via a resistor 37. A capacitor 43 connects the anode of LED 35 to ground.

The emitters of the differential pair are tied to constant 30mA current source 58 through emitter degeneration resistors 39 and 41, respectively. Both bases of transistors 38 and 40 are biased to approximately 2.5 Volts with resistor networks comprising voltage-divider resistors 110 and 112 and voltage-divider resistors 114 and 116. A bypass capacitor 118 is connected to the base of transistor 40. A smoothing LC circuit comprising an inductor 120 and a capacitor 122 connects the +5 volt supply to circuits 32 and 34. The base of transistor 38 is effectively driven by the Current Switch Driver 24 complimentary output DSOT− through isolation capacitor 28. The base of transistor 40 is not driven, resulting in single-ended operation.

DSOT− has very little D.C. offset, by virtue of the balanced coding scheme employed within block 10; having a voltage swing of approximately 0.7 volts. The net effect of this is that isolation and coupling capacitor 28 tends to produce a 0.7 volts peak to peak signal about the 2.5 volts bias point at the base of transistor 38.

When DSOT− asserts, the negative voltage swing is tracked by capacitor 28, lowering the voltage at the base of transistor 40. This causes the base of transistor 38 to drop to approximately 2.15 volts. As the 30mA current source 58 attempts to track this change by lowering the potential of the junction of resistors 39 and 41, the LED driver transistor 40 begins to turn on. The emitter resistor junction cannot swing to a low enough potential to keep transistor 38 on so all of the current is supplied by transistor 40. At this point the emitter resistor junction is at approximately 1.60 Volts.

When DSOT− deasserts, the voltage swing, in this case, positive, is again tracked by capacitor 28. As the base voltage rises towards 2.85 volts, transistor 38 begins to turn on again. As transistor 38 begins to supply more to the 30mA current, the emitter resistor junction potential begins to rise, until it reaches 1.95 Volts. At this point, transistor 40 is completely off.

Capacitor 118 filters noise at the base of transistor 40 and maintains a stable bias potential, when the transistor witches. Without this capacitor, the base bias voltage could wander due to parasitic capacitances both within the transistor and on the printed circuit board.

The optical driver of the instant invention employs a peaking circuit 34 to improve the quality of the optical waveform generated by LED 35. The peaking circuit draws additional current through the LED when it is initially turned on, and charges up the cathode when the LED is initially turned off. This action tends to sharpen the turn on and turn off response of the LED.

The circuit 34 which performs the peaking function is another differential current switch including transistors 46 and 52 which operates in parallel with the current switch 32. The collector of transistor 46 has a special load consisting of resistor 50 and inductor 48. Peaking circuit 34 is coupled into the LEDs cathode node via capacitor 44.

The emitters of the differential pair are tied to a second constant 30mA current source 60 through emitter degeneration resistors 53 and 47. Both bases are biased to approximately 2.5 Volts with resistor networks comprising voltage dividers comprising resistors 128 and 130 and resistors 132 and 134. A bypass capacitor 136 is connected to the base of transistor 52. The base of transistor 46 is effectively driven by the Current Switched Driver 24 true output DSOT+ through isolation capacitor 30. The base of transistor 52 is not driven, resulting in single-ended operation.

DSOT+ has the same A.C. and D.C. characteristics of DSOT− described earlier. Thus, coupling capacitor 30 tends to produce a 0.7 volts peak to peak signal about the 2.5 volts bias point at the base of transistor 46.

The basic behavior of the peaking current switch 34 is the same as the LED driver current switch 32. When DSOT+ asserts, the positive voltage swing is tracked by capacitor 30, raising the voltage at the base of transistor 46. This causes the base of transistor 46 to rise to approximately 2.85 volts. As the 30mA current source 60 attempts to track this change by raising the potential of the junction of resistors 47 and 53, transistor 52 begins to turn off, its base being held at a fixed potential. Thus, all 30mA must be supplied by transistor 46. At this point the emitter resistor junction is at approximately 1.95 Volts.

As the collector of transistor 46 begins to sink current, inductor 48 initially presents a high impedance current path. To satisfy the collector's demands, capacitor 44 provides an alternate lower impedance path. The current demands are then supplied by the cathode of the Transmit LED 35. As time passes, inductor 48 begins to conduct current, and capacitor 44 supplies less current. The net effect of this is a current pulse at the Transmit LED 35 on the asserting edge of DSOT+.

Similarly, on the deassertion of DSOT+, the negative voltage swing is tracked by capacitor 30, lowering the voltage at the base of transistor 46. This causes the base of transistor 46 to lower to approximately 2.15 volts. Again, the 30mA current source 60 attempts to track this change by lowering the potential of the junction of resistors 47 and 53, turning transistor 52 on and transistor 46 off.

Transistor 46 turns off quickly. However, inductor 48 continues to conduct current. This current travels to the cathode of the Transmit LED 35 via capacitor 44. Since transistor 40 is off at this time, current is injected into the LED. From a charge standpoint, electrons are removed from the cathode of the Transmit LED to capacitor 44 to balance the charge that was withdrawn to satisfy the needs of the inductor. This effectively causes a negative "peak" in the current waveform at the cathode of LED 35, and causes the cathode to charge up.

Capacitor 136 filters noise at the base of transistor 52 and maintains a stable bias potential, when the transistor switches. Without this capacitor, the base bias voltage could wander due to parasitic capacitances both within the transistor and on the printed circuit board. Resistor 50 is used for damping as well as loading transistor 46. Resistor 54 loads transistor 52.

The Current Source Generation circuitry comprising current sources 58 and 60 and current source control 62 is used to set the level of operating current for the Optical Transmitter Driver.

Figure 2C:
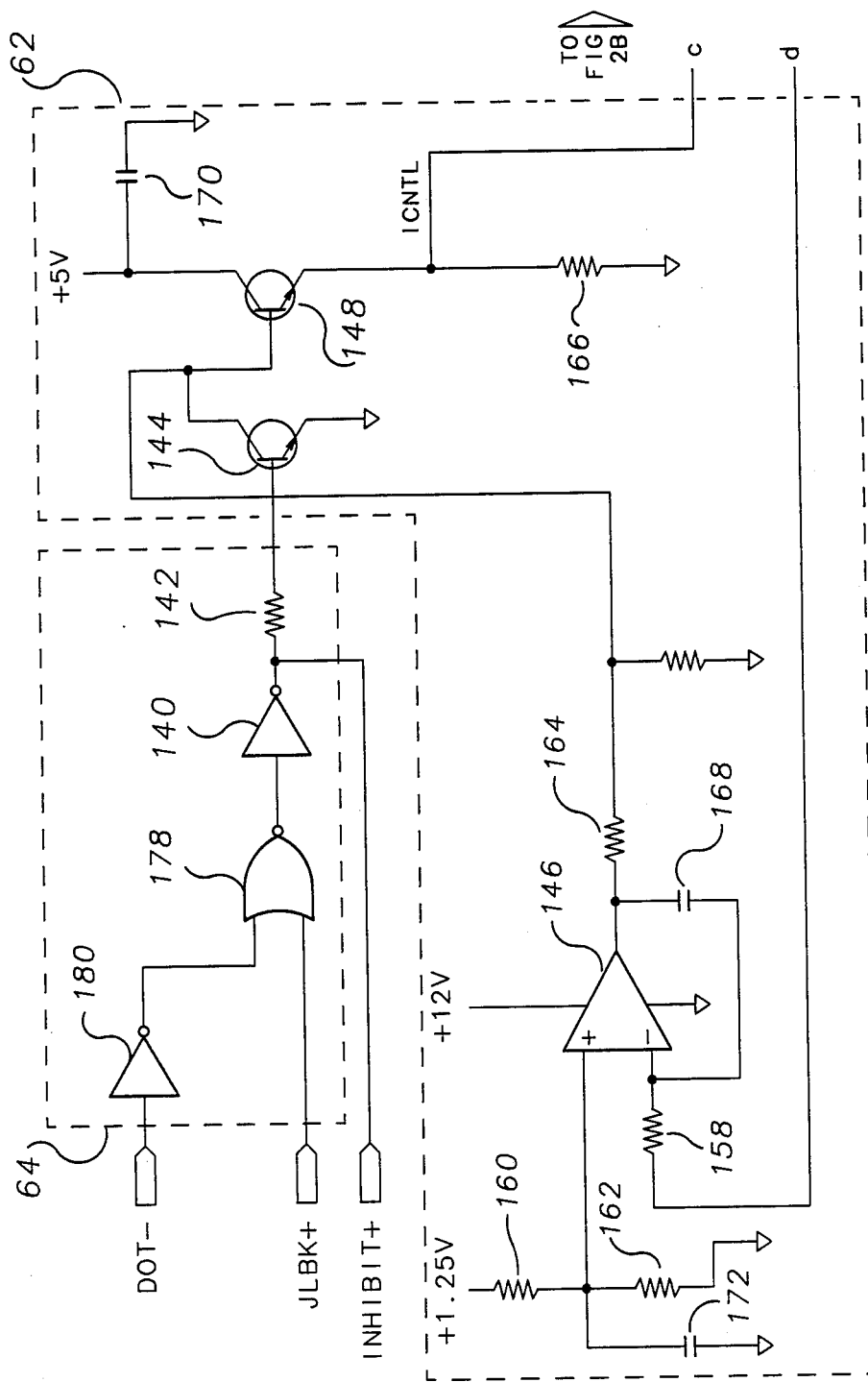

Referring to the block diagram, FIG. 2C, in normal operation, INHIBIT+ is deasserted and the output voltage of inverter 140 is less than 0.4 volts. Resistor 142 couples the output of inverter 140 to the base of a transistor 144. Therefore transistor 144 is off and may be ignored. An op amp 146 and transistors 148 and 150 form a closed loop which determines the amount of controlling base current that the current sources 58 and 60 formed by transistors 150 and 152 are provided.

Referring again to FIG. 2B, the level of current flowing through transistor 150 is determined by a sense resistor 154, connected between the emitter of transistor 150 and ground, which provides a sense voltage proportional to the current. The current flowing through transistor 152 is the same magnitude as that through transistor 150 since both transistor bases are common and resistor 154 is equal in value to a resistor 156 connected between the emitter of transistor 152 and ground.

Referring again to FIG. 2C, the sensed voltage is conducted to an inverting input of op amp 146 via resistor 158 compared against a 0.6 volt reference established by voltage divider resistors 160 and 162 at the noninverting positive terminal. A 0.6 volt reference is obtained because resistors 160 and 162 are equal in magnitude and the reference voltage which they are dividing down is set to approximately 1.2 volts.

If the inverting terminal is lower in voltage than the voltage at the noninverting terminal, a positive differential exists and the output of op amp 146 increases. This causes current to flow through a resistor 164 and into the base of transistor 148. The collector of transistor 148 is connected as an emitter follower and the amplified base current flows out the emitter and across a resistor 166 connected between the emitter of transistor 148 and ground. When the voltage across resistor 166 begins to approach 0.6 volts, current also begins to flow into the base of transistor 150 and transistor 152. This causes the voltage across the sense resistor 154 to increase, which in turn, decreases the voltage differential measured by op amp 146, tending to stabilize the loop.

If the sense voltage is too high, the op amp 146 lowers its output voltage, decreasing the amount of bias current to the transistors and causes the sense voltage to decrease.

The loop will stabilize when the sense voltage is approximately 0.6 volts which corresponds to a collector current in transistor 150 (and transistor 152) of 30 milliamps.

A capacitor 168 connected between the output of op amp 146 and its inverting input is a compensation capacitor to assure op amp stability.

A capacitor 170 connected between the collector of transistor 148 and ground is used to filter out high frequency variations in the biasing voltage applied to the bases of transistors 150 and 152. A bypass capacitor 172 is connected in parallel with resistor 162.

With reference again to FIG. 2B, compliance of the current sources is further aided by the presence of two ferrite beads, 174 and 176, which are placed between the collectors of the current source transistors 150 and 152 and the emitter resistor junctions of the current switch 32 and peaking circuit 34, respectively. The beads have the property of dissipating (rather than storing) energy at high frequencies. The beads tend to isolate the current sources from switching effects at their loads.

The Optical Transmit circuitry of the present invention is placed in Inhibit Mode whenever INHIBIT+ is asserted. INHIBIT+ is asserted when either JLBK+ or Disable_Optic_Transmitter− (abbreviated as DOT− in the diagram) are asserted. The INHIBIT+ function is implemented by a NOR gate 178 and two inverters 140 and 180.

When INHIBIT+ is asserted, sufficient current flows from inverter 140 through bias resistor 142 to turn on transistor 144 and place it in saturation. This forces the collector of transistor 144 to lower its voltage to less than 0.5 volts and in turn, causes transistor 148 and then transistor 150 and transistor 152 to turn off.

Op amp 146 will sense this condition and raise its output voltage. Since transistor 144 is in saturation, however, it will sink all the current flowing through resistor 164 and the current sources 58 and 60 will remain diabled.

Deasserting INHIBIT+ will cause a large amount of current to flow in the transistors 148 and 150 path, raising the sense voltage and the op amp 146 will then regulate the differential as previously explained.

What is claimed is:

1. A circuit for driving an electro-optical transducer, operable at a first level and a second level, from digitally-encoded signals including at least a first and a second differential signal, comprising:
   first current switching means responsive to said first differential signal for generating therefrom a signal driving said electro-optical transducer;
   second current switching means operably coupled to said first current switching means and responsive to said second differential signal for generating a signal cooperating with said signal driving said electro-optical transducer causing additional current to flow through said electro-optical transducer when said first current switching means drives said transducer to said first level, and causing negative current to flow through and producing a charge buildup on, said transducer when said first current switching means drives said transducer to said second level; and
   means connected to said first and second current switching means for maintaining current flow through said first and second current switching means at a first and a second predetermined level, respectively, said cooperating first and second current switching means ensuring said predetermined current levels remain constant.

2. An electro-optical transducer driver according to claim 1 wherein said first and second differential signals are generated by emitter-coupled logic (ECL) drivers, wherein said first and second current switching means each include a first and a second pair of NPN transistors, each said pair emitter-coupled by degeneration resistance means, connected to said current flow maintenance means, for preventing instability in said ECL drivers and for supplying an operating range for said first pair of NPN transistors, having a predetermined OFF current level.

3. An electro-optical transducer driver according to claim 1 wherein said first current switching means comprises:
   a first and a second NPN transistor, each having an emitter terminal, a collector terminal and a base terminal;
   a first and a second degeneration resistor each having connected a first terminal to said emitter terminal of said first and second NPN transistors, respectively, and having second terminals connected together;
   a first and a second biasing means connected to said base terminal of said first and second NPN transistors for establishing an operating point for said transistors;
   a first load resistor having a first terminal connected to said collector of said first NPN transistor and a second terminal coupled to a source of positive voltage;
   wherein said electro-optical transducer is a light-emitting diode (LED) having an anode coupled to said source of positive voltage and a cathode connected to said collector of said second NPN transistor; and
   wherein said second current switching means comprises:
   a third and a fourth NPN transistor, each having an emitter terminal, a collector terminal and a base terminal;
   a third and a fourth degeneration resistor each having a first terminal connected to said emitter terminal of said third and fourth NPN transistors, respectively, and having second terminals connected together;
   a third and a fourth biasing means connected to said base terminal of said third and fourth NPN transistors for establishing an operating point for said transistors;
   a second load resistor having a first terminal connected to said collector of said third NPN transistor and a second terminal coupled to said source of positive voltage;

an inductor having a first terminal connected to said fourth NPN transistor collector and a second terminal; and a resistor having a first terminal connected to said inductor second terminal and a second terminal coupled to said source of positive voltage; and a capacitor having a first terminal connected to said second NPN transistor collector terminal and a second terminal connected to said fourth NPN transistor collector terminal, said capacitor providing said operable coupling of said second current switching means to said first current switching means;

said first and said second differential signals coupled to said base terminal of said first and said fourth NPN transistors, respectively.

4. An electro-optical transducer driver according to claim 3 wherein said current flow maintenance means comprises:

first and second means for isolating said current flow maintenance means from said first and second current switching means each having a first terminal connected to said common connector of said first and second degeneration resistors and said common connection of said third and fourth degeneration resistors, respectively, and a second terminal;

first and second current-source NPN transistors each having a collector terminal connected to said second terminal of said first and second isolation means, respectively; a base terminal, and an emitter terminal connected to ground via a resistor; and current source control means responsive to the voltage level at said first current-source NPN transistor emitter for generating control current conducted to said first and second current-source NPN transistor bases which establishes the operating point thereof.

5. An electro-optical transducer driver according to claim 4 wherein said current source control means comprises:

an operational amplifier having an inverting input terminal responsive to said voltage level at said first current-source NPN transistor; having a non-inverting input terminal connected to a predetermined reference voltage, and an output terminal;

a feedback capacitor having a first terminal connected to said operational amplifier output terminal and a second terminal connected to said inverting terminal of said operational amplifier; and an NPN control transistor having a base terminal coupled to said operational amplifier output terminal via a resistor, a collector terminal connected to said source of positive voltage and an emitter terminal connected to said first and second current-source NPN transistor bases and connected to ground via a resistor, said current conducted between said bases of said first and second current-source transistors and said base of said NPN control transistor being said control current.

6. An electro-optical transducer driver according to claim 5 wherein said current source control means is further responsive to a suppress signal, and further comprises:

a suppression NPN transistor having an emitter terminal connected to ground, a base responsive to said suppression signal, and a collector terminal connected to said base terminal of said NPN control transistor.

* * * * *